US012598141B2

(12) United States Patent
Dowse et al.

(10) Patent No.: US 12,598,141 B2
(45) Date of Patent: Apr. 7, 2026

(54) METHOD AND SYSTEM FOR TIME STAMPING OF PACKET DATA IN VIRTUALIZED AND CLOUD ENVIRONMENTS

(71) Applicant: Corvil Limited, Dublin (IE)

(72) Inventors: Ian Edward Dowse, Dun Laoghaire (IE); Filip Matracki, Izabelin (PL); Raymond Russell, Mamaroneck, NY (US); Kenneth Wade Jinks, Donabate (IE)

(73) Assignee: Corvil Limited, Dublin (IE)

( * ) Notice: Subject to any disclaimer, the term of this patent is extended or adjusted under 35 U.S.C. 154(b) by 0 days.

(21) Appl. No.: 19/218,064

(22) Filed: May 23, 2025

(65) Prior Publication Data

US 2025/0365232 A1 Nov. 27, 2025

(30) Foreign Application Priority Data

May 24, 2024 (EP) ..................................... 24178060

(51) Int. Cl.
*H04L 47/11* (2022.01)
*H04L 47/28* (2022.01)

(52) U.S. Cl.
CPC .............. *H04L 47/11* (2013.01); *H04L 47/28* (2013.01)

(58) Field of Classification Search
CPC ................................. H04L 47/11; H04L 47/28
See application file for complete search history.

(56) References Cited

U.S. PATENT DOCUMENTS

| | | | |
|---|---|---|---|
| 7,664,823 B1 * | 2/2010 | Wakerly | ................ G06F 15/163 |
| | | | 712/228 |
| 2008/0144624 A1 | 6/2008 | Marcondes et al. | |
| 2010/0182991 A1 * | 7/2010 | Abraham | .............. H04J 3/0664 |
| | | | 370/349 |
| 2016/0350683 A1 * | 12/2016 | Bester | ................ G06Q 10/0633 |
| 2018/0131591 A1 * | 5/2018 | Toomey | .............. H04L 43/0894 |
| 2019/0155645 A1 * | 5/2019 | Browne | ................ G06F 9/4881 |
| 2020/0112500 A1 * | 4/2020 | Wang | ................. H04L 43/0817 |
| 2021/0320881 A1 * | 10/2021 | Coyle | ................. H04L 47/2441 |
| 2023/0008730 A1 * | 1/2023 | Ulman | ................. H04L 1/0061 |
| 2023/0030135 A1 * | 2/2023 | Li | ......................... H04L 43/106 |
| 2023/0275852 A1 * | 8/2023 | Benzaoui | ............. H04J 3/0661 |
| | | | 370/355 |

OTHER PUBLICATIONS

European Patent Office, Extended European Search Report in EP Application No. 24178060.0, mailed Nov. 11, 2024, 7 pages.

* cited by examiner

*Primary Examiner* — Sujoy K Kundu
*Assistant Examiner* — Weibin Huang
(74) *Attorney, Agent, or Firm* — Schwabe, Williamson & Wyatt, P.C.

(57) ABSTRACT

A method and system for time stamping of packet data is described. Advantageous aspects of how time stamping of packet data can be achieved in both virtualized and cloud environments are detailed.

14 Claims, 6 Drawing Sheets

PRIOR ART

PRIOR ART

METHOD AND SYSTEM FOR TIME STAMPING OF PACKET DATA IN VIRTUALIZED AND CLOUD ENVIRONMENTS

CROSS-REFERENCE TO RELATED APPLICATIONS

This application claims priority to European Patent Application No. 24178060.0, filed on May 24, 2024, the disclosure of which is incorporated herein in its entirety.

FIELD OF THE INVENTION

The present invention relates to time stamping of packet data. It more particularly relates to a method and system for time stamping of packet data in virtualized and cloud environments.

BACKGROUND

In packet-based networks, time stamping refers to the process of associating a specific time value with packets as they traverse the network. This time stamping mechanism is crucial for various network operations, including performance monitoring, network troubleshooting, synchronization, and QoS (Quality of Service) management. It provides an accurate and scaleable mechanism to monitor the traffic flow and using time stamp data it is possible to identify and address congestion within the network.

The time stamp provides a snap shot of the local system time and can be associated with both incoming (ingress) and outgoing (egress) packets. In effect it provides an identification of the point in time that a packet traverses a specific node within the network. It is recognised that it is important to be able to accurately record the time stamp, as incorrect records can cause a delay in identifying and resolving issues within the network. Timestamps can be generated at different points within the network infrastructure. Commonly, timestamps are added at the following locations:

Sender: Timestamps can be added at the source of the packet, typically by the network interface card (NIC) or the sending application.

Intermediate Network Devices: Timestamps may also be added at intermediate network devices such as routers, switches, or gateways as packets traverse through them.

Receiver: In some cases, timestamps are added by the receiving network interface card or application upon packet arrival.

The precision of timestamps can vary depending on the capabilities of the time stamping mechanism and the requirements of the network application. Higher precision timestamps offer more accurate time measurement but may require more resources. FIG. 1 shows in schematic simplified form a typical arrangement that is used to process ingress packets at a network node. Data packets 100 arrive at a host system 110 where they are received into a network interface card, NIC, 120. The NIC 120 provides a buffering arrangement whereby the packets 100 once received at the host system 110 are stored in the NIC until such time as they are read from the NIC by the operating system, OS. The OS is configured to analyse the packets and route them to the appropriate application software 130, as will be appreciated by those of ordinary skill.

The packets are typically read in a first in, first out—FIFO-arrangement and the NIC is polled periodically, or via an interrupt mechanism, to excise buffered packets from the NIC. It will be appreciated that an interrupt-based packet reception is a known approach that can be used by an OS. It works quite well at low packet rates because the software can respond quickly without wasting resources with periodic polling. At high packet rates, however, polling is much more efficient because there is an overhead to processing each interrupt. Furthermore, as will be appreciated by those of ordinary skill, interrupt processing may limit the accuracy of timestamps because interrupt latency may vary, and it can be particularly high when a packet arrives after a pause.

In the context of NIC polling, it will be understood that many NICs use "descriptors" to manage packets in the queue. Usually there is a circular list of descriptors with a write pointer (used by the NIC) and read index (used by the OS/application). Each descriptor points at a memory buffer with space for a packet. The NIC writes packets and advances the write index, and the OS/application reads packets and advances the read index. This is useful in that the NIC can determine how much space is left by comparing the two indexes, and the OS/application can also determine how many packets are ready. Polling the NIC involves scanning the list of received packets, saving copies of all the packet buffer pointers, updating the descriptors to point at new buffers, and then finally advancing the read index to make the new descriptors available to the NIC for new packets. Polling in very small batches is inefficient because the NIC read pointer has to be advanced more often, and generally it is more efficient for applications to process packets in larger batches. However, if the batch size is too large then the NIC can risk running out of descriptors while the application is performing the polling operation. It also implies less frequent polling, which impacts timestamp accuracy. There is evidently therefore also an optimisation requirement if polling is to be used to read the NIC buffer.

At a low level, polling the NIC involves identifying what packets are ready to read, and then scanning those packets. Depending on the hardware and/or API, it may be possible to identify the packets that are ready to read before actually scanning those packets. For example, if the NIC updates a write descriptor index register, then reading it allows comparison against a previous value to identify the number of packets received and the index number of each packet's descriptor.

Irrespective of the method of reading, within such architectures, and as explained above, there is a need to associate the individual packets with time stamps on arrival.

There are a variety of different approaches to provide time stamps and overall, the method used to apply timestamps to packets depends on factors such as network architecture, performance requirements, compatibility with existing protocols, and available hardware capabilities. For example, some Network Interface Cards, NICs, and network devices support hardware-based time stamping capabilities. In hardware time stamping, and as exemplified in FIG. 2 where the same reference numerals are used for similar components, dedicated time stamping modules 200 or circuitry within the network hardware capture the time at specific points in the packet's journey through the network. Hardware timestamps can be added at wire speed with minimal processing overhead, making them suitable for high-speed networks and applications requiring precise timing.

In contrast, and as shown in FIG. 3, in software time stamping, timestamps are added by the network stack or the operating system software running on the NIC or the host system's CPU as the packet is read from the NIC (300). When a packet is received, the software captures the current time and inserts the timestamp into a designated data-field or meta-data field associated with the packet. This approach is flexible and can be implemented without specialized hardware support but may introduce processing overhead.

It is recognised that each of these two approaches are better suited for different applications or environment.

For example, hardware time stamping relies on dedicated time stamping modules or circuitry integrated into NICs or network devices. These modules capture the time at specific points in the packet's journey through the network and insert timestamps directly into metadata fields that are associated with individual packets.

Advantageously, it offers low latency and high precision time stamping, typically at wire speed; minimizes processing overhead on the host CPU as time stamping is offloaded to dedicated hardware modules; and is well-suited for high-speed networks and applications requiring precise timing, such as financial trading or network synchronization.

In contrast, software time stamping is traditionally implemented by the network stack or the operating system running on the host system's CPU. When a packet is transmitted or received, the software captures the current time and inserts time stamps into the meta-data fields using processing resources available on the host system. It does not require access to dedicated hardware but may introduce additional processing overhead on the host CPU, especially in high-throughput environments. In addition, time stamp accuracy and precision can be affected by factors such as system load, interrupt handling, and scheduling latency. In short, it is known that software time stamping can provide flexibility and ease of implementation but may not offer the same level of performance as hardware-based solutions, particularly in demanding network environments.

For that reason, where there is a requirement for high accuracy or deployment in high-speed network environments, there is a traditional preference to use a hardware approach for generating time stamps. This is achievable where the entity that is monitoring the network traffic has access to the hardware components of the network. This can however be challenging in virtualized or cloud environments, where the actual hardware that is deployed by the cloud provider is not accessible to the party that is using the cloud services, nor do they necessarily have the ability to specify what hardware should exclusively be used for their network traffic.

As a result, a time stamping solution that does not require specialised hardware components and yet can provide accuracy typically associated with hardware solutions is required.

SUMMARY

These and other problems are addressed by a method and system in accordance with the present invention which provides a method and system for time stamping of packet data in virtualized and cloud environments.

In one aspect the method comprises:
identifying from a network interface card, NIC, a first set of packets at a first point in time;
identifying from the NIC a second set of packets at a second point in time;
recording each of the first and second points in time and determining a time span between each of the first and second points in time;
identifying the number of packets in the second set of packets and assigning individual ones of the packets with an individual time stamp, such that elements of the second set of packets are each associated with a respective time stamp, and wherein the time stamps for the second set of packets are distributed within the time span between first and second points in time.

The identification of the packets may be effected by a polling operation. In another arrangement the identification may be effected using interrupt based packet reception.

The second set of packets will typically comprise a plurality of packets. Time stamps for each of the packets within the second set are desirably equally distributed within the time span.

The packets are typically read in a first in, first out (FIFO) manner such that the packet last received into the NIC is associated with a later time stamp than the packet first received into the NIC.

The last received packet in the second set of packets is typically associated with the time stamp associated with the second point in time.

In the event that polling is used, the frequency of polling can be fixed or can be varied. In a varied configuration the frequency of polling can be adjusted dependent on the number of packets read in any one polling event.

A system for timestamping packets received at an ingress node in a network, as detailed in the claims is also provided. In addition, a method of timestamping packet data exiting a network node per the claimed method is also provided.

These and other aspects will be better understood with reference to the exemplary arrangements which follow, which are provided to assist the person of ordinary skill in a better understanding of the present teachings.

DETAILED DESCRIPTION OF THE DRAWINGS

Figure 1:
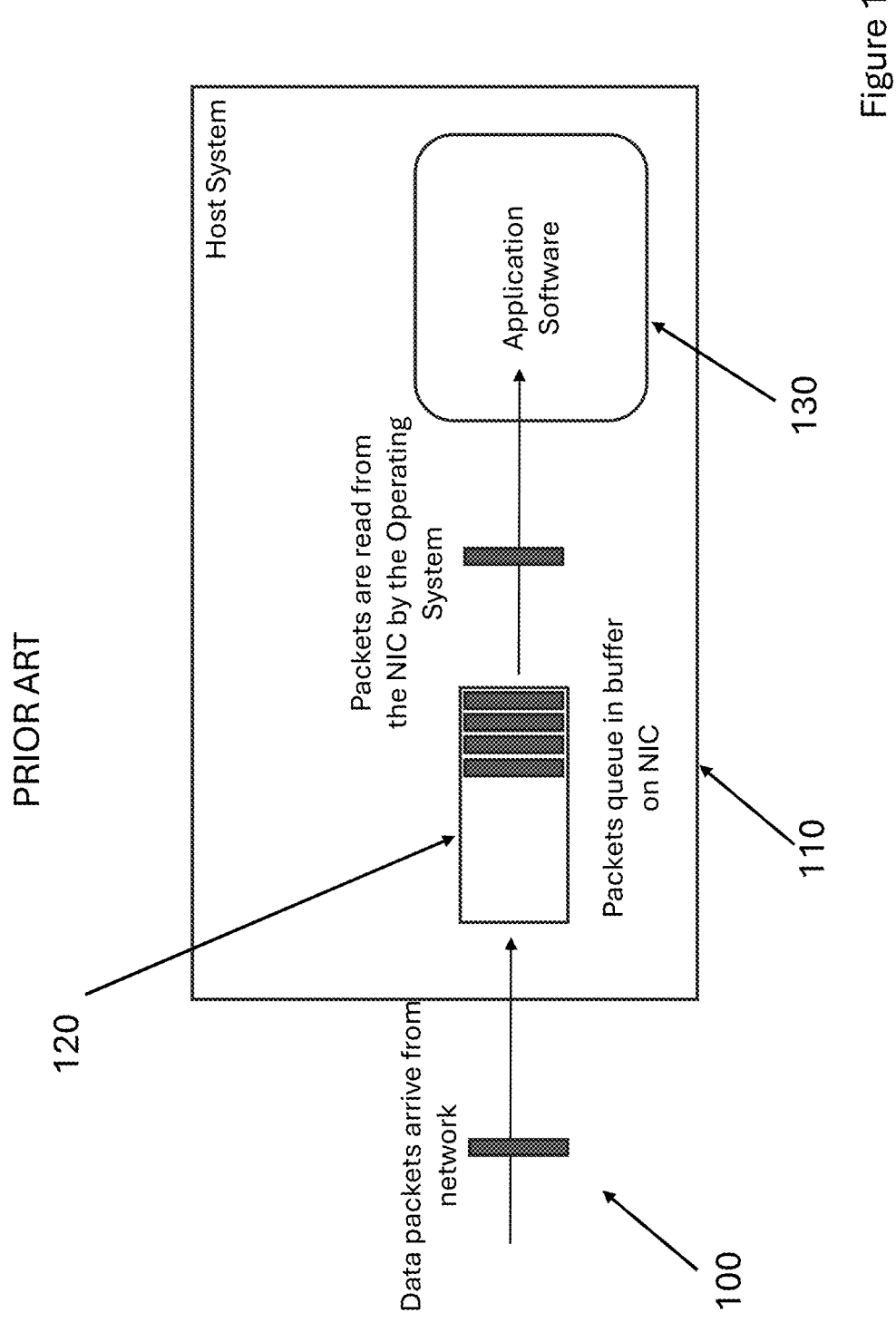
FIG. 1 is a schematic overview of conventional packet processing at an ingress node of a network.
Figure 2:
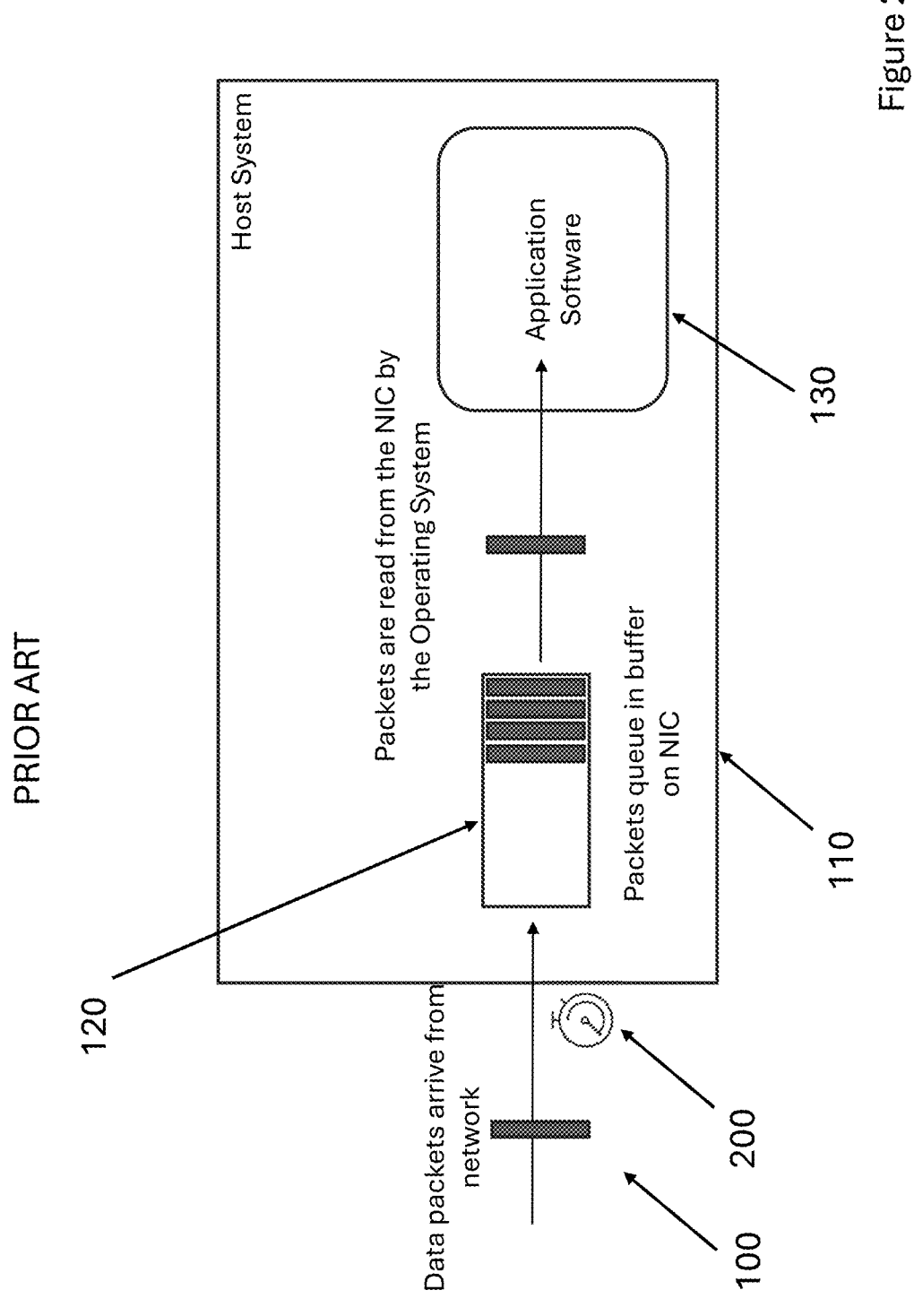
FIG. 2 is a schematic overview of use of hardware to provide time stamping of packets at an ingress node of a network.
Figure 3:
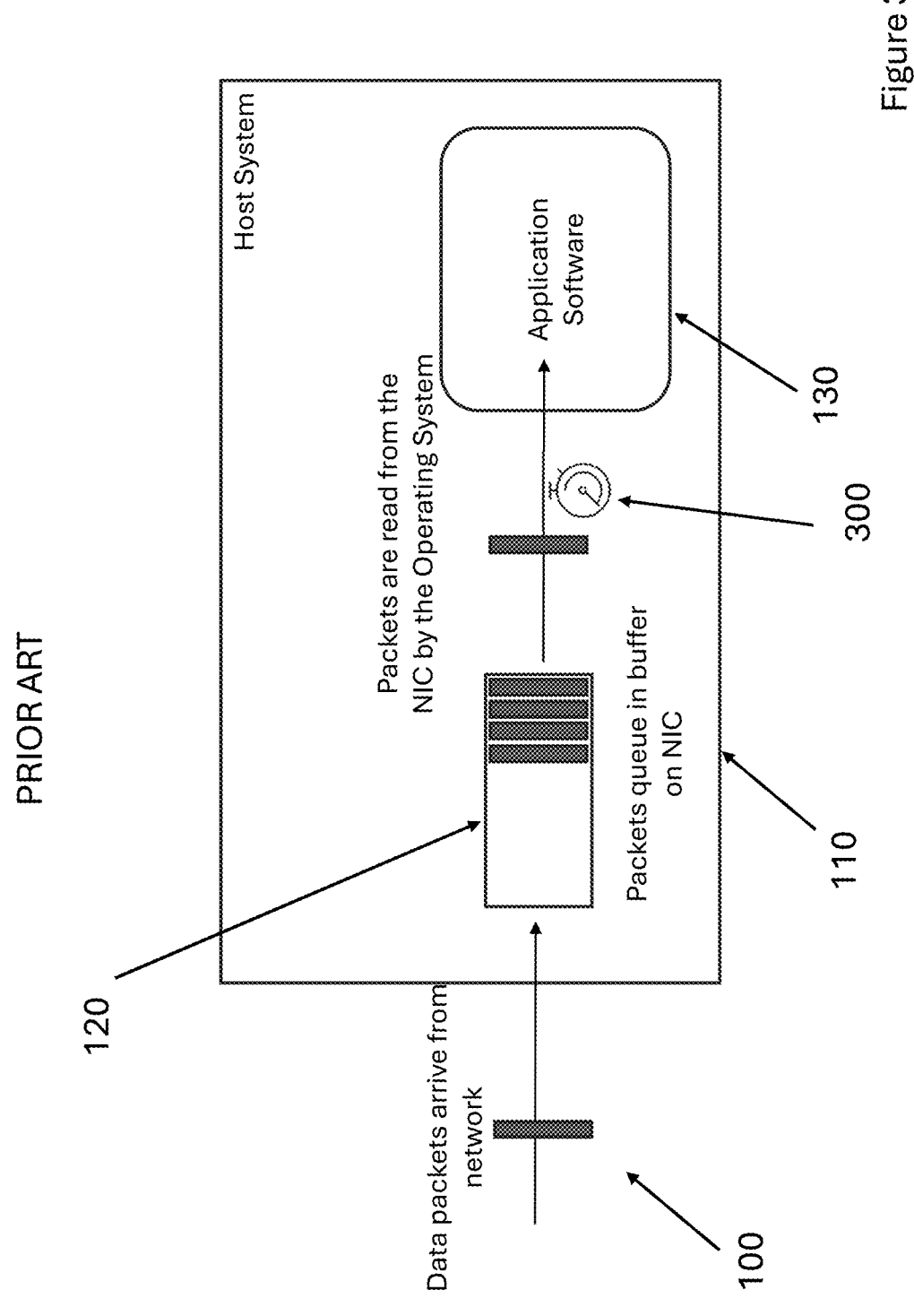
FIG. 3 is a schematic overview of use of software to provide time stamping of packets at an ingress node of a network.

The present teaching will now be described with reference to FIGS. 4, 5, and 6 which provide an example of a method and system for providing individualised time stamps to packets within virtualised or cloud network. Given that the present methodology can be deployed in software within such a cloud environment, it will be appreciated that it can be deployed on conventional hardware configurations and for that reason the same reference numerals will be used for components already described.

As was discussed previously in any network ingress node it is known that packets 100 are received into a network interface card, NIC, 120. The packets form a queue, typically a First in First out—FIFO—queue within the NIC. Per the present invention, the NIC may be periodically investigated so as to identify the packets that are currently in the NIC. When assigning timestamps to packets, it is advantageous to use the fastest method available to identify the set of packets that were received since the last poll, so it may give better results to identify the packets first via the write descriptor index value, and then scan the packets afterwards.

Within the context of the present teaching, the identification of the packets in the NIC can be achieved through for example a polling or interrupt-based arrangement, or indeed a combination of the two, dependent on the specifics of the network architecture and its constraints.

Within the context of the present teaching the term "polled" may be used to generically refer to a "reading" or "identification" operation be that implemented through actual polling or through an interrupt-based arrangement. Irrespective of the manner of identification, the process is a batch operation where a plurality of packets are identified, and details provided into an internal buffer 400 (FIG. 4 shows an example of two packets being read in the instant batch). It will be appreciated that this buffer can be considered as being a software implemented buffer. Each read operation into the internal buffer can be associated with a specific point in time as provided by a clocking routine-shown schematically as a clock 410. The actual time of polling can be determined in any number of conventional manners.

Figure 5:
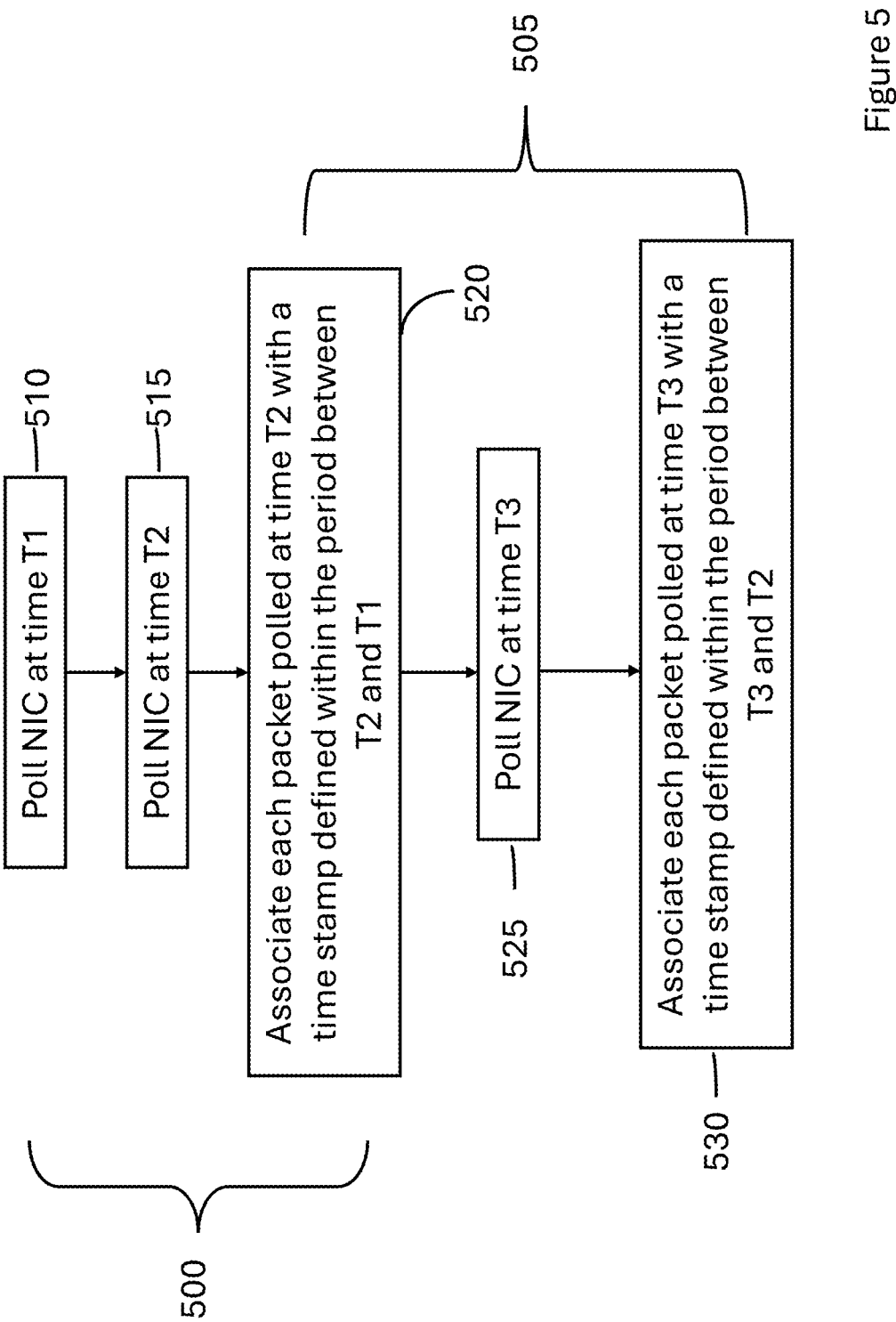
FIG. 5 is an exemplary process flow showing first and second sets of polling operations at an ingress node per a method in accordance with the present teaching.
Figure 6:
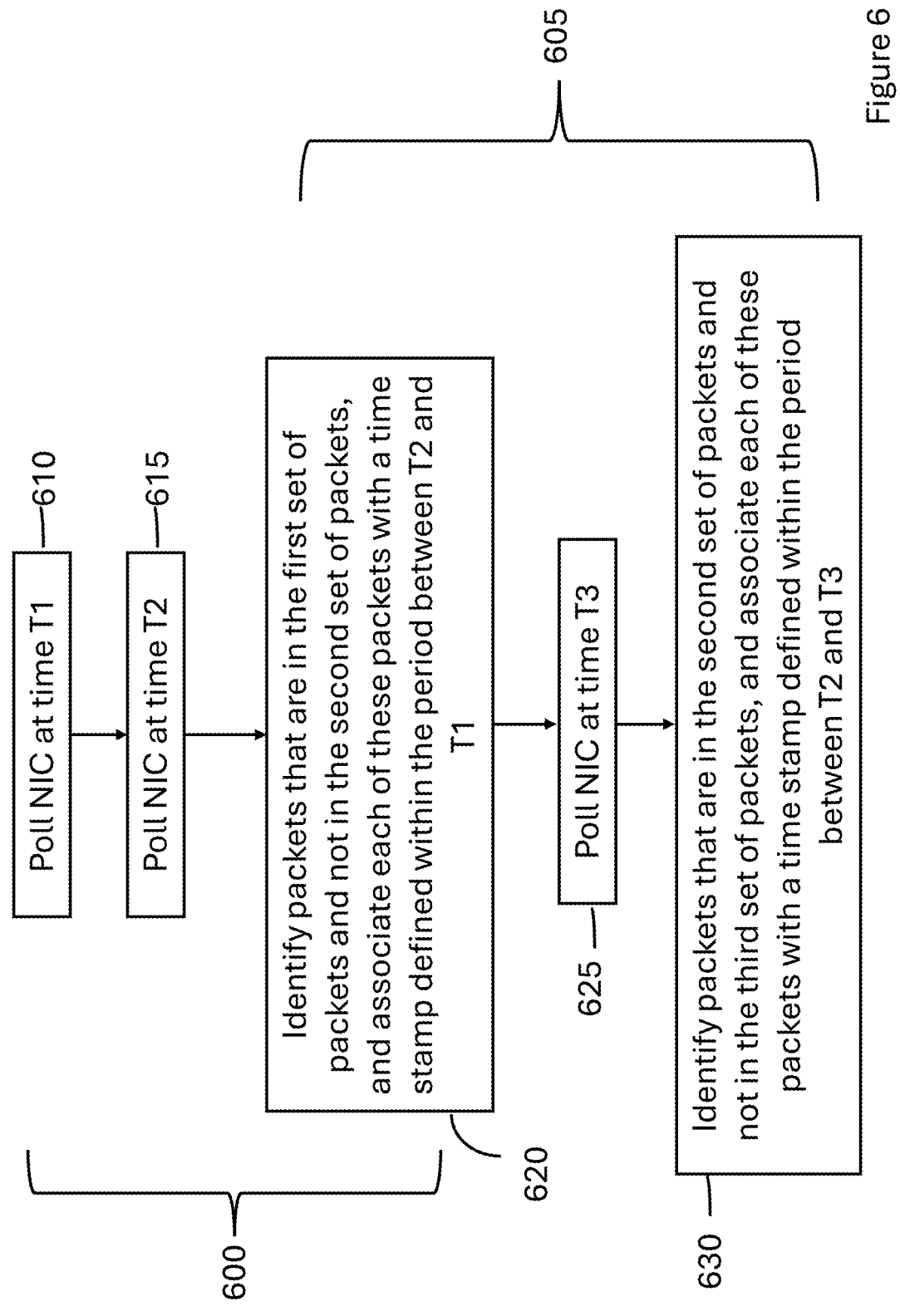
FIG. 6 is an exemplary process flow showing first and second sets of polling operations at an egress node per a method in accordance with the present teaching.

As exemplified with reference to FIG. 5, the present methodology relies in determining a time span between two measured polling times and then distributing the time stamps of the individual packets polled within that time span. This can be considered a series of overlapping operations 500, 505, each operation comprising a polling operation at a first point in time, and a second point in time.

Using the example of FIG. 5 in the first operation 500, in a first step 510, at a first point in time, T1, the NIC is polled and the packets are identified. At a second step 515, which is at a second later point in time, T2, the NIC is again polled and the packets are again identified. Each polling operation will effectively read a batch of packets—the batch having between received within the time interval defined between the two polling operations.

Using the first operation 500, it will be understood that if the NIC queue is empty after polling at time T1 (that is, details of all packets in the NIC queue at time T1 have been read into the internal buffer), then all packets polled at time T2 will have been received into the NIC at a time later than time T1 and before time T2.

Per the present teaching, and based on this understanding, the individual ones of the packets polled at time T2 can then be each associated 520 with a specific time defined within the period between time T1 and time T2.

Similarly using the example of FIG. 5 in a second iteration 505 of the set of operations, the second operation 505 allocates the second time T2, from the first operation 500, as the first point in time for the second operation. At a later point in time, T3, the NIC is polled (step 525) and the packets are again read. This polling of the NIC at time T3 returns a batch of packets that must have been received into the NIC later than time T2 and before time T3, again assuming that the NIC queue is empty after the polling operation at time T2. Based on these assumptions, it is possible to associate 530 each packet polled at time T3 with a time stamp defined within the period between T3 and T2.

In practice however, the present inventors have identified that the NIC queue may not be empty directly after polling, in which case the actual arrival time of some or all packets polled at time T2 may be prior to time T1. The timestamps assigned using the above procedure can then be understood as approximate, subject to an error proportionate to how long packets spend in the NIC queue.

The occurrence of this error can be controlled by ensuring that the capacity of the system to process incoming packets and remove them from the NIC queue is larger than the average rate at which they enter the queue. In particular, the likelihood that the NIC queue is empty after polling is at least:

$$1 - (A \times \Delta T)/N,$$

where A is the average packet arrival rate, $\Delta T$ is the duration between polls, and N is the maximum number of packets polled in each polling period.

It will be understood that this approximation can be validly based on a premise that if we assign $T_1$, $T_2$, . . . to represent successive polling times, and let $\Delta T$ be the period between successive polls, and let N represent the maximum number of packets requested from the NIC queue at each poll, then the number received will be less than N if the NIC queue contains fewer than N packets, and in this case we assume that the NIC queue is empty after polling.

This system can be effectively modelled as a discrete-time queue with N servers, each of which can process 1 packet in time $\Delta T$. At each polling time, the servers draw up to N packets from the NIC queue, process them for time $\Delta T$, and then release them before drawing the next set of packets, if there are packets available. Without loss of generality, we label the servers 1,2, . . . , N and assume that during each polling period the first packet in the NIC queue is placed in server 1, the second in server 2, and so on, until all servers are occupied or the NIC queue is empty.

Let $Q_k$ represent the steady-state occupancy of server k, i.e. $Q_k=1$ if and only if server k is currently processing a packet. According to Little's Law (which the person of ordinary skill will appreciate is a theorem that determines the average number of items in queuing systems), the time-average value $\overline{Q_k}$ satisfies:

$$\overline{Q_k} = \overline{A_k} \times \overline{T_k}$$

Where $\overline{A_k}$ is the average arrival rate of packets into server k and $\overline{T_k}$ is the average time that each packet spends in server k. Now $\overline{T_k}$ is fixed and always equal to $\Delta T$, while server k will contain a packet during the current polling period if and only if there were at least k packets in the NIC queue at the start of the period, just prior to polling. Therefore, denoting by Q the size of the NIC queue prior to polling, the probability distribution of Q can be determined from the equation:

$$\overline{Q_k} = P(Q \geq k) = \overline{A_k} \times \Delta T.$$

Summing over k we obtain:

$$\sum_{k=1}^{N} P(Q \geq k) \leq A \times \Delta T$$

where we observe that the total average arrival rate of packets into all N servers cannot be greater than the average arrival rate A into the NIC queue.

The NIC queue is empty after polling if and only if the queue length Q prior to polling is less than or equal to N, therefore:

$$P(\text{empty}) = 1 - P(Q > N) \geq 1 - \frac{1}{N}\sum_{k=1}^{N} P(Q \geq k).$$

It will be understood that here we make use of the fact that. for each k=1, . . . , N, P(Q>N)≤P(Q>k), since the first eventuality implies the second. Combining the last two inequalities we obtain $$P(\text{empty}) \geq 1 - (A \times \Delta T)/N.$$

Therefore, it will be appreciated that by adjusting the system parameters N and $\Delta T$ in relation to an observed or planned average arrival rate A, we can ensure that the NIC queue will be empty after polling for at least a pre-specified fraction F of the time. As will be appreciated by those of skill in the art, if the arrival of packets is approximated by a Poisson stochastic process, then the proportion of packets for which the NIC queue is empty after they are polled will also be approximately F. Per the present teaching, and based on this understanding, the individual ones of the packets polled at time T3 can then be each associated with a specific time defined within the period between time T2 and time T3.

It will be appreciated that this set of operations becomes an iterative step of operations where time durations between individual successive polling operations are then distributed across the packets that are received in the later polling operation.

The number of packets that are in any one batch will evidently depend on the network traffic and the polling frequency. It will be understood that the polling period affects the error in two distinct ways: first, directly, since it is not possible to discriminate arrival times at a granularity smaller than the polling period.

The frequency of the polling will evidently contribute to the measurement error as if the time is too large for the number of packets in any one batch, then the actual association of a time stamp for an individual packet within that polled batch will have a higher degree of error. A second effect comes from the fact that, if the polling period is long, then if all other things are equal it will be understood from the equation above that the queue is less likely to be empty after polling (i.e. the queue is not being drained frequently enough). It will be understood that the first, direct effect, introduces an error equal to the polling period itself. The second, indirect effect can be measured and/or reduced by recording times when the NIC queue is empty, as explained further below.

Figure 4:
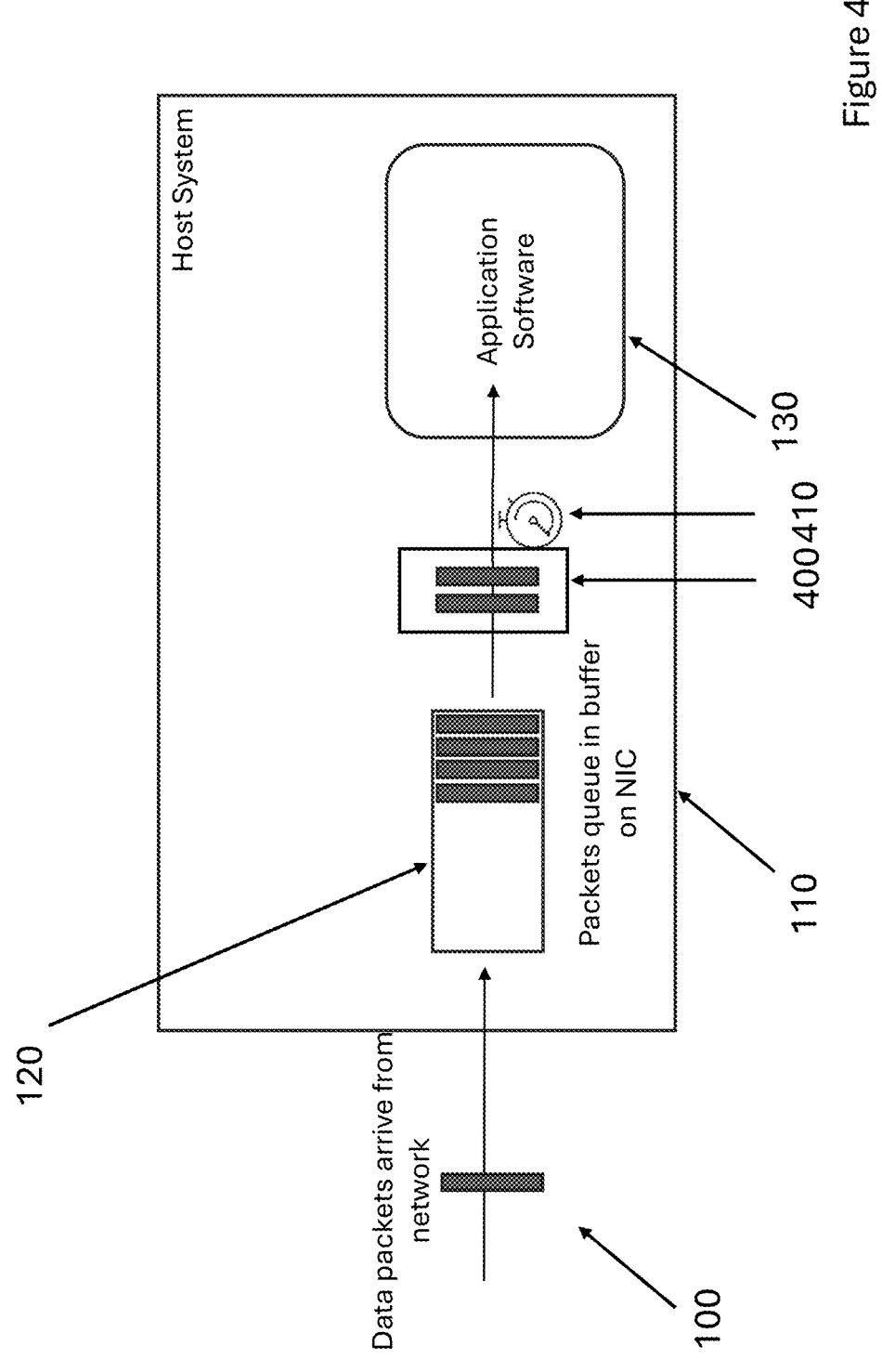
FIG. 4 is a schematic overview of an approach per the present teaching that can be deployed in a cloud or virtualised environment to provide individual time stamps to packets received at an ingress node of the network.

Using the methodology of FIG. 5 and the schematic architecture of FIG. 4, it will be understood that the process includes a plurality of repeated steps. During each poll, at most N packets are received from the NIC queue 120. The actual number of packets received is p, where 0<=p<=N.

1. Record the timestamp after polling, and call it t_after (in FIG. 5, this is T2 for the first operation 500, and T3 for the second operation 505)

2. Assume packets were received uniformly on the NIC since the previous polling time. The previous or last time polled is called t_last (in FIG. 5, this is T1 for the first operation 500, and T2 for the second operation 505). It will be appreciated that the faster the polling frequency, the truer this assumption is.

3. The gap between packets is packet_gap=(t_after−t_last)/p

4. With this gap it is possible to assign a software timestamp to each packet (step 520 of the first operation 500, and step 530 of the second operation 505):

$$t\_last + (1 + packet\_index) * packet\_gap$$

5. Assign t_after to t_last (so T2 becomes equivalent to T1 for the second operation 505)

It will be understood that where the polling function returns less than N packets, subsequent polling iterations could read packets into the remaining space in the same internal buffer in order to improve the efficiency of downstream processing. In such cases, it is only necessary to query the NIC for at most N—p packets instead of N. This is advantageous in that it can ensure that the internal buffer 400 will not overflow—and evidently this is also determined by the original definition of the size of the internal buffer as ideally the buffer is sized to hold at least N packets. It will be understood however that storing the results of multiple polling operations in a single internal buffer before eventually delivering the results in that buffer to the application will increase the delay in delivering said results, so it would require logic to limit that delay, but such modifications will be apparent to those of skill in the art.

The present inventors have identified that creating a very tight polling function with almost no conditional logic and branching minimizes the time in between polling to a negligible value. This means less packet drops and higher bandwidth, but at the same time it will be understood that polling in a continuous loop wastes CPU cycles and may increase power consumption. However, it will also be understood that polling for less than the maximum NIC size with a sufficiently high frequency can be faster than polling for the maximum queue size with more complex management of internal buffers.

In practice, it will be understood that accuracy is optimized when the NIC queue is drained as efficiently as possible, which may be achieved using a short polling interval and choosing the buffer size N to balance the trade-off between memory usage, drain-rate, and the latency of results delivered to the consuming application. If the value of N is too small then the buffer may not have sufficient space to hold results for all the packets arriving into the NIC within a polling interval, implying that the NIC queue will not be drained by each polling operation and the accuracy of inferred timestamps will deteriorate. However, larger values of N entail a larger buffer for holding results and require more memory to be allocated. As explained above, it is most efficient to completely fill the buffer with results, from multiple polling operations if necessary, before delivering it to the application, but in practice results cannot be delayed indefinitely and therefore it may be necessary to deliver the buffer partially filled to avoid excessive latency. This is wasteful of memory resources, and the larger the buffer is relative to the volume of arriving packets within polling intervals, the lower the utilization of buffer memory will be. Therefore, it is desirable to choose a small value of N, but no smaller than a minimum value that maintains a high drain-rate and preserves accuracy. This value can be determined, for a specified or measured packet arrival rate, choice of polling interval, and desired error probability, using the above inequality for P(empty). Alternatively, an appropriate value can be found by applying a desired input traffic rate and monitoring for packet drops at the NIC queue, which occur when the queue is not being drained quickly enough to keep up with the input rate. This operation can be done periodically or as part of a calibration step.

It will be understood that the above is an example of how it is possible to use a single timestamp per packet. It will be appreciated that the present teaching should not be considered as being limited to this specific mechanism.

For example, in steps 2-4 above, the serialization bandwidth of the NIC could be taken into account when estimating how packet timestamps should be distributed over the interval t_last, t_after.

In another variation, it is possible to use two timestamps per packet instead of one, and then to use these timestamps to measure the accuracy under the assumption that we can determine when the NIC queue is empty. For example in step 5, it is possible to set t_last equal to t_after only when we believe that the NIC queue is empty after reading, to reflect the fact that when the queue is not empty, we cannot guarantee that packets subsequently read arrived after t_after. The goal would be to ensure that [t_last, t_after] are always accurate bounds on the true arrival timestamps of the packets in the current batch. If the NIC queue is a single simple buffer, then we can assess that it is empty when the number of packets read is less than the number requested (N). Otherwise, there may be a separate device API call that we can use to determine whether it is empty.

It will be appreciated that in this arrangement, instead of attaching a single timestamp to each packet for use downstream, we could instead attach a pair [t_last, t_after] representing a bounding interval for a batch of packets. Another alternative would be to estimate timestamps for individual packets within these bounds using the serialization bandwidth. Furthermore, if the NIC queue remains unemptied for a long time then t_last will not advance and the bounds will become broad (reflecting a genuine loss of accuracy due to inability to drain the NIC queue). We can prevent the bounds from becoming indefinitely broad by observing that packets cannot wait forever in the NIC queue which has finite maximum size. If the maximum queue size is B then the maximum time that a packet can wait in the queue is $T\_B=(B/N)\times T$, where T is the polling period and N is the number of packets read per poll. Therefore, at step 6 when the NIC queue is not assessed to be empty, we can set t_last=max(t_last, t_after−T_B).

In another variation, when we are able to assess that the NIC queue is not empty after polling, we can immediately or iteratively poll again to retrieve further packet details, allocating a new memory buffer to hold these details if necessary. This process can be repeated until we reach a point where either the queue is empty, or available memory resources are exhausted. This approach has the effect of adjusting the polling period in response to the number of packets retrieved, helping to ensure that the drain-rate keeps up with the packet arrival rate and minimizing the error in the assigned timestamps where possible.

It will be appreciated that the above examples have been with respect to ingress timestamping—i.e. capturing the time when data packets enter the network. This is typically done right as the packets are received by the network device from an external source, such as another network or a client device. The person of ordinary skill will appreciate that this provides data that helps in analyzing network performance, identifying latency issues, and tracking the flow of data into the network. Ingress timestamping is typically focused on understanding how data enters the network and assessing the network's ability to handle incoming traffic as it can provide an indication of latency experienced by packets as it enters the network.

It will be appreciated that in a similar fashion, egress timestamping, the capturing of the time when data packets exit the network can also provide a useful indication of network performance in delivering data to its intended destination, detecting delays, and assessing overall network efficiency. Egress timestamping occurs as the packets are about to leave the network device to be forwarded to their destination, which could be another network or a client device. When transmitting packets, it is normally straightforward to record a timestamp for when the packet is added to the NIC transmit queue. However, if there are packets in the queue already, then the timestamp will not accurately reflect the time that the packet was transmitted from the NIC. In a way that is analogous to measuring receive timestamps as described above, it is possible to poll the transmit queue periodically to determine a time bound when each packet left the queue.

The operation will evidently be a little different in that the polling operation is looking to see when a particular packet has actually left the egress NIC. As shown in FIG. 6, this can be achieved in accordance with the present teaching by polling 610 an egress network interface card, NIC, at a first point in time, T1, to identify a first set of packets and then polling 615 the egress NIC at a second point in time, T2. By comparing the packets polled in each of the first and second polling operations, it is possible to then identify whether the first set of packets are still in the egress NIC in the second polling operation. If they are not, then it can be assumed that these packets have left the egress NIC within the period of time that is between the first and second points in time. For that reason by recording each of the first and second points in time and determining a time span between each of the first and second points in time it is possible to identify 620 the number of packets in the first set of packets and assigning individual ones of the packets with an individual time stamp distributed within the time span between first and second points in time on determining that first set of packets are not in the egress NIC at the second point in time. This set of operations can be considered a first 600 computation cycle. Similarly to that described above with reference to the operations at the ingress node, it is possible to repeat the first operation cycle for further iterations. As exemplified in FIG. 6, it is possible to poll 625 the NIC a third time, T3. By comparing the packets polled in each of the second and third polling operations, it is possible to then identify whether the second set of packets are still in the egress NIC in the third polling operation. If they are not, then it can be assumed that these packets have left the egress NIC within the period of time that is between the second and third points in time. For that reason by recording each of the second and third points in time and determining a time span between each of the second and third points in time it is possible to identify 630 the number of packets in the second set of packets and assigning individual ones of these packets with an individual time stamp distributed within the time span between second and third points in time on determining that second set of packets are not in the egress NIC at the third point in time.

This set of operations can be considered a second 605 computation cycle. These cycles can, it will be appreciated, be repeated indefinitely.

It will be appreciated that advantageous mechanisms for time stamping of packet data have been described. Per the present teaching it is possible to provide such time stamping in both virtualized and cloud environments are detailed. While the teaching has been exemplified with respect to specific embodiments as detailed above, it will be understood that modifications may be made without departing from the spirit or scope of the present teaching which is intended to be limited only insofar as is deemed necessary in light of the claims that follow.

The invention claimed is:

1. A method of timestamping packet data, the method comprising:

identifying from a network ingress node a first set of packets at a first point in time;

identifying from the network ingress node a second set of packets at a second point in time;

recording each of the first and second points in time and determining a time span between each of the first and second points in time;

identifying the number of packets in the second set of packets and assigning an individual time stamp to individual ones of the packets, such that the second set of packets are each associated with a respective time stamp, and wherein the time stamps for the second set of packets are distributed within the time span between the first and second points in time; and wherein the packets are identified using a polling operation, wherein the polling operation at any one point in time does not effect a reading of all packets within the network ingress node, and wherein the polling operation provides a set of read packets and an indication of packets that were not read.

2. The method of claim 1 wherein the second set of packets comprises a plurality of packets and time stamps for each of the packets within the second set are equally distributed within the time span.

3. The method of claim 1 wherein the packets are identified in a first in first out, FIFO, manner such that a packet last received into the network ingress node is associated with a later time stamp than a packet first received into the network ingress node.

4. The method of claim 3 wherein a last received packet in the second set of packets is associated with the time stamp associated with the second point in time.

5. The method of claim 1 wherein the frequency of polling is one of fixed or adjustable.

6. The method of claim 1 wherein the frequency of polling adjustable and wherein it is adjusted dependent on the number of packets read in any one polling event.

7. The method of claim 1 wherein on identifying remaining packets that are not read in any one polling operation, the method comprises iteratively polling the network ingress node until such time as all packets are read.

8. The method of claim 1 wherein the network ingress node comprises a network interface card, NIC.

9. A system for timestamping packets received at an ingress node in a network, comprising:

a. an ingress node configured to receive data packets from one or more external sources;

b. a timestamping module operatively coupled to the ingress node, the timestamping module configured to assign a timestamp to each received packet;

c. a storage unit communicatively coupled to the timestamping module, the storage unit configured to store the assigned timestamps associated with each received packet;

d. a processor communicatively coupled to the timestamping module and the storage unit, the processor configured to control the operation of the timestamping module and to manage the storage of timestamps in the storage unit; and wherein the timestamping module is configured to carry out the method of claim 1 to assign the timestamp to each received packet.

10. A method of timestamping packet data, the method comprising:

identifying from a network ingress node a first set of packets at a first point in time;

identifying from the network ingress node a second set of packets at a second point in time;

recording each of the first and second points in time and determining a time span between each of the first and second points in time;

identifying the number of packets in the second set of packets and assigning an individual time stamp to individual ones of the packets, such that the second set of packets are each associated with a respective time stamp, and wherein the time stamps for the second set of packets are distributed within the time span between the first and second points in time; and wherein the time span between each of the first and second points in time is related to an identified average rate at which packets enter the network ingress node.

11. The method of claim 10 further comprising monitoring network traffic entering the network ingress node and adjusting the time span between each of the first and second points in time in response to identifying changes in the monitored traffic.

12. A system for timestamping packets received at an ingress node in a network, comprising:

a. an ingress node configured to receive data packets from one or more external sources;

b. a timestamping module operatively coupled to the ingress node, the timestamping module configured to assign a timestamp to each received packet;

c. a storage unit communicatively coupled to the timestamping module, the storage unit configured to store the assigned timestamps associated with each received packet;

d. a processor communicatively coupled to the timestamping module and the storage unit, the processor configured to control the operation of the timestamping module and to manage the storage of timestamps in the storage unit; and wherein the timestamping module is configured to carry out the method of claim 10 to assign the timestamp to each received packet.

13. A method of timestamping packet data, the method comprising:

identifying from a network ingress node a first set of packets at a first point in time;

identifying from the network ingress node a second set of packets at a second point in time;

recording each of the first and second points in time and determining a time span between each of the first and second points in time;

identifying the number of packets in the second set of packets and assigning an individual time stamp to individual ones of the packets, such that the second set of packets are each associated with a respective time stamp, and wherein the time stamps for the second set of packets are distributed within the time span between the first and second points in time; and wherein assigning individual ones of the packets with an individual time stamp comprises associating each packet with a time stamp pair representing a bounded interval for the second set of packets.

14. A system for timestamping packets received at an ingress node in a network, comprising:

a. an ingress node configured to receive data packets from one or more external sources;

b. a timestamping module operatively coupled to the ingress node, the timestamping module configured to assign a timestamp to each received packet;

c. a storage unit communicatively coupled to the time-stamping module, the storage unit configured to store the assigned timestamps associated with each received packet;

d. a processor communicatively coupled to the time-stamping module and the storage unit, the processor configured to control the operation of the timestamping module and to manage the storage of timestamps in the storage unit; and wherein the timestamping module is configured to carry out the method of claim 13 to assign the timestamp to each received packet.

*   *   *   *   *